(12) United States Patent
Miao et al.

(10) Patent No.: US 8,737,339 B2
(45) Date of Patent: May 27, 2014

(54) ANTENNA WEIGHTING IN RELATION TO TRANSMISSIONS FROM TWO CELLS (75) Inventors: Qingyu Miao, Beijing (CN); Johan Bergman, Stockholm (SE); Johan Hultell, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 72 days.

(21) Appl. No.: 13/389,508

(22) PCT Filed: Jan. 12, 2012

(86) PCT No.: PCT/SE2012/050016
§ 371 (c)(1),
(2), (4) Date: Feb. 8, 2012

(87) PCT Pub. No.: WO2012/096621
PCT Pub. Date: Jul. 19, 2012

(65) Prior Publication Data
US 2012/0207110 A1    Aug. 16, 2012

Related U.S. Application Data (60) Provisional application No. 61/432,735, filed on Jan. 14, 2011.

(51) Int. Cl.
H04W 4/00    (2009.01)
(52) U.S. Cl.
USPC .......................................................... 370/329
(58) Field of Classification Search
USPC .............. 370/310, 310.2, 320, 328, 329, 332, 370/334; 455/59, 69, 513, 561, 522, 562.1, 455/456.1
See application file for complete search history.

(56) References Cited

U.S. PATENT DOCUMENTS

| | | | |
|---|---|---|---|
| 8,289,869 B2 * | 10/2012 | Sawai | 370/252 |
| 2004/0137952 A1 * | 7/2004 | Umesh et al. | 455/562.1 |
| 2005/0245284 A1 * | 11/2005 | Mizuguchi | 455/562.1 |
| 2007/0149126 A1 * | 6/2007 | Rangan et al. | 455/63.1 |
| 2009/0232122 A1 * | 9/2009 | Suda et al. | 370/345 |

(Continued)

FOREIGN PATENT DOCUMENTS

| | | |
|---|---|---|
| EP | 2023502 A1 | 2/2009 |
| WO | 2010/048985 A1 | 5/2010 |

OTHER PUBLICATIONS

Jungnickel, V. et al. "Implementation Concepts for Distributed Cooperative Transmission." 2008 42nd Asilomar Conference on Signals, Systems and Computers, Oct. 26-29, 2008, pp. 1035-1039.

(Continued)

*Primary Examiner* — Anh-Vu Ly
*Assistant Examiner* — Gustavo Lopez-Vargas
(74) *Attorney, Agent, or Firm* — Murphy, Bilak & Homiller, PLLC (57) ABSTRACT The invention concerns a method and an antenna weight determining device (37) for improving handling of two data streams sent in downlink data communication channels to a user equipment (14) via a first and a second cell of a wireless communication network, where the antenna weight determining device comprises a unit (38) for processing data obtained in relation to communication signals sent at least between at least one of the second cells and the user equipment, and a unit (41) for determining an antenna weight to be applied by the second cell based on the processing.

19 Claims, 8 Drawing Sheets (56) References Cited

U.S. PATENT DOCUMENTS

2010/0081451 A1* 4/2010 Mueck et al. ............. 455/456.1
2010/0246527 A1* 9/2010 Montojo et al. ............. 370/330
2010/0323611 A1* 12/2010 Choudhury ..................... 455/7
2011/0190031 A1* 8/2011 Pfann et al. ................... 455/561

OTHER PUBLICATIONS

Park, J. et al. "Efficient GSVD Based Multi-user MIMO Linear Precoding and Antenna Selection Scheme." IEEE Conference on Communications, 2009 (ICC '09), Jun. 14-18, 2009, pp. 1-6.

* cited by examiner

ANTENNA WEIGHTING IN RELATION TO TRANSMISSIONS FROM TWO CELLS

TECHNICAL FIELD

The invention relates to antenna weighting performed in relation to cells of a wireless communication network. More particularly, the invention relates to a method and antenna weight determining device for improving of handling of two data streams sent in downlink data communication channels to a user equipment via a first and a second cell.

BACKGROUND

High Speed Downlink Packet Access (HSDPA) transmissions to a User Equipment (UE) have up until now only occurred from one network node, the so-called serving, Node B. During the last couple of years the following trends have however become apparent:

UE capabilities and processing power have increased considerably. This is driven both by the development of the long-term evolution (LTE) supporting significant peak data rates and the multi-carrier (MC) evolution within Wideband Code Division Multiple Access/High Speed Packet Access (WCDMA/HSPA).

Main-remote network architectures in which multiple cells located at different physical locations share baseband unit (and which enables fast coordination without RNC involvement between the cells) are becoming increasingly popular.

The user demand for high peak data rates and operators' desire to manage their wireless resources efficiently have (and continue to) increased. This is a consequence of that mobile operators have started to rely on WCDMA/HSPA technology to offer mobile broadband services.

These observations have triggered discussions in the Third Generation Partnership Project (3GPP) on standardizing support for multi-cell transmissions. The multi-cell transmissions techniques discussed during 2010 include:

1. Switched transmit diversity techniques (e.g., High-Speed Data-Discontinuous Transmission (HS-DDTx), This class of techniques is based on that transmissions from different cells are coordinated so that the inter-cell interference is minimized; thereby a virtual ("soft") reuse factor is introduced.

2. Multi-flow transmission techniques (e.g. Single-Frequency Dual-Cell High-Speed Downlink Packet Access (SF-DC-HSDPA): This class of techniques is based on that several, independent data streams are transmitted to the same UE from different sectors possibly belonging to different sites. The gains associated with this class of techniques stems from "spatial resource pooling".

3. Single frequency network transmissions (e.g. High-Speed Single-frequency Network (HS-SFN): This technique is based on that identical data to the same UE from multiple cells simultaneously. This technique is based on that the transmitted data is combined in the "air" and the UE will thus experience a stronger received signal.

However, such signals when being sent in multiple data streams from different cells will typically propagate different distances before reaching the UE, which may lead to the signals in the data streams having different characteristics when received by the user equipment. This may counteract the desired improvement in quality and may even in some cases worsen the quality of the combined signal. There is therefore a need for improvement in this regard.

SUMMARY

The invention is therefore directed towards providing a way to improve the quality of reception of two data streams received in a UE via two cells.

This object is according to a first aspect of the invention achieved through a method for improving handling of two data streams sent in downlink data communication channels to a user equipment via a first and a second cell of a wireless communication network. The method is performed by an antenna weight determining device and comprises:

processing data obtained in relation to communication signals sent between at least one of the cells and the user equipment, and determining an antenna weight to be applied by the second cell based on the processing.

This object is according to a second aspect achieved by an antenna weight determining device for improving handling of two data streams sent in downlink data communication channels to a user equipment via a first and a second cell of a wireless communication network. The antenna weight determining device comprises:

a unit for processing data obtained in relation to communication signals sent between at least one of the cells and the user equipment, and a unit for determining an antenna weight to be applied by the second cell based on the processing.

According to a first variation of the first aspect, the processing comprises estimating data communication channels between the second cell and the user equipment and the first cell and the user equipment.

According to a first variation of the second aspect, the unit for processing is a unit for estimating data communication channels between the second cell and the user equipment and the first cell and the user equipment.

According to a second variation of the first aspect, the estimating comprises estimating data communication channels through applying properties of pilot signals sent from the first and second cell in a system model comprising the data communication channels.

According to a second variation of the second aspect, the antenna weight determining device is provided in the user equipment and the unit for estimating data communication channels comprises a block for estimating the properties of pilot signals sent from the first and second cell and a block for applying the properties in a system model comprising the data communication channels.

The properties of the pilot signals may comprise the power of the pilot signals.

According to a third variation of the first aspect, the estimating comprises determining the powers of the pilot signals, determining the power offsets of the data communication channels and modifying the power of the pilot signals with the power offsets of the data communication channels before being applied in the system model.

According to a third variation of the second aspect, the block for estimating the properties of pilot signals is further configured to determine the powers of the pilot signals, determine the power offsets of the data communication channels and modify the power of the pilot signals with the power offsets of the data communication channels before being applied in the system model.

According to a fourth variation of the first and second aspects, a preferred weight is determined through maximising a reception quality parameter of the data signals.

According to a fifth variation of the first aspect, the method further comprises reporting the determined antenna weight to the network According to a fifth variation of the second aspect, the unit for determining an antenna weight is configured to report the weight to the network.

According to a sixth variation of the first aspect, the estimating comprises estimating uplink data communication channels associated with the downlink data communication channels through obtaining the covariance between signals received by antennas of the first and second cells, creating a covariance matrix R, performing an eigenvalue decomposition of the covariance matrix into a unitary matrix U and a diagonal matrix S. The determining of an antenna weight also comprises comparing power differences of the diagonal elements of the diagonal matrix, selecting a diagonal element and selecting a pre-coding vector in the unitary matrix corresponding to the selected diagonal element of the diagonal matrix as a weight to be applied by the second cell in downlink According to a sixth variation of the second aspect, the antenna weight determining device is provided in the network. Here the unit for estimating data communication channels comprises a block for estimating uplink channels associated with the downlink data communication channels, a block for obtaining the covariance between signals received by antennas of the first and second cells, a block for creating a covariance matrix R and a block for performing an eigenvalue decomposition of the covariance matrix into a unitary matrix U and a diagonal matrix S. The unit for determining an antenna weight in turn comprises a block for comparing power differences of the diagonal elements of the diagonal matrix, a block for selecting a diagonal element and a block for selecting a pre-coding vector in the unitary matrix corresponding to the selected diagonal element of the diagonal matrix as a weight to be applied.

According to a seventh variation of the first and second aspects, the selected pre-coding vector is a pre-coding vector for which the corresponding diagonal element of the unitary matrix has the largest gain.

According to an eighth variation of the first aspect, the processing comprises changing the antenna weight of the second cell and measuring feedback information concerning the proper reception of data. In this variation the determining of the antenna weight also comprises determining whether to use the new antenna weight or not based on a change in the pattern of feedback information.

According to an eighth variation of the second aspect, the antenna weight determining device is provided in the network. In this variation the unit for processing comprises a block for changing the antenna weight of the second cell and a block for measuring feedback information concerning the proper reception of data. In this variation the unit for determining of the antenna weight is furthermore configured to determine whether to use the new antenna weight or not based on a change in the pattern of feedback information According to a ninth variation of the first aspect, the method further comprises transmitting data to the user equipment from the second cell, which data is weighted using the determined antenna weight.

According to a ninth variation of the second aspect, the antenna weight determining device also comprises a unit for transmitting data to the user equipment from the second cell, which data is weighted using the determined antenna weight. Here the antenna weight determining device may be a Node B.

According to further variations of the invention the transmitted data may be identical to data sent via the first cell and scrambled using a scrambling code that is common for the first and second cells.

According to some variations of the invention, the antenna weight may be signalled in the downlink.

According to some variations of the invention, the antenna weight may also be used in the transmission of the pilot signal together with the data.

The invention has a number of advantages. It improves the quality if data received by a user equipment, which in turn has the further advantage of allowing higher data speeds to be used.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which:

FIG. 8 shows a block schematic of a third variation of an antenna weight determining device, FIG. 9 schematically shows a flow chart of a number of method steps in a general method for improving handling of two data streams according to a first embodiment of the invention, FIG. 10 schematically shows a number of method steps in a method for improving handling of two data streams according to a second embodiment of the invention being performed in the user equipment, FIG. 11 schematically shows a number of further method steps being performed in the user equipment, FIG. 12 schematically shows a number of method steps in a method for improving handling of two data streams according to a third embodiment of the invention being performed in the network, FIG. 13 schematically shows a number of method steps in a method for improving handling of two data streams according to a fourth embodiment of the invention being performed in the network, FIG. 14 schematically shows transmissions from the first and second cells to the first user equipment.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention concerns the transmission of data from a number of cells to a user equipment (UE) in a wireless communication network. The network may be a Wideband Code Division Multiple Access/High Speed Packet Access (WCDMA/HSPA) network and may furthermore with advantage employ a downlink multi-point transmission technique.

Figure 1:
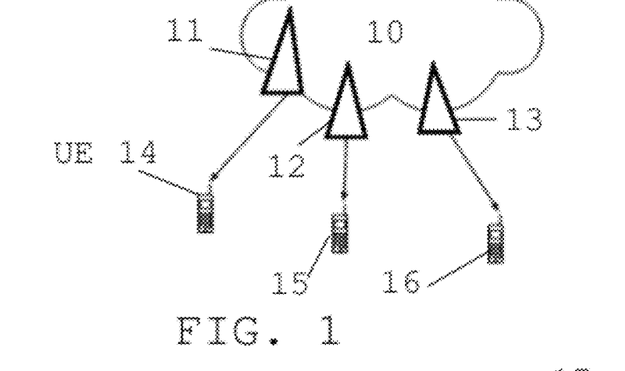
FIG. 1 schematically shows a wireless communication network comprising a first, second and third base station as well as a first, second and third user equipment, FIG. 2 schematically shows the first user equipment, FIG. 3 schematically shows the second exemplifying base station, FIG. 4 schematically shows a first, second and third cell provided by the first, second and third base station, respectively, as well as the transmissions from the first and second cells to the first user equipment, FIG. 5 schematically shows exemplifying units of a user equipment employed for receiving data from the two cells.

FIG. 1 schematically shows such an exemplifying wireless communication network 10 in which there is provided a first, a second and a third base station or Node B 11, 12 and 13. There is here furthermore shown a first, second a third user equipment (UE) 14, 15 and 16, where the first user equipment 14 is served by the first base station 11, the second user equipment 15 is served by the second base station 12 and the third user equipment 16 is served by the third base station 13.

As is shown in FIG. 1 the example network 10 may include one or more instances of user equipment (UEs) 14, 15, 16 and one or more base stations 11, 12 and 13 capable of communicating with these UEs, along with any additional elements suitable to support communication between UEs or between a UE and another communication device (such as a landline telephone). Although the illustrated UEs may represent communication devices that include any suitable combination of hardware and/or software, these UEs may, in particular embodiments, represent devices such as an example UE illustrated in greater detail by FIG. 2. Similarly, although the illustrated base stations may represent network nodes that include any suitable combination of hardware and/or software, these base stations may, in particular embodiments, represent devices such as the example base station illustrated in greater detail by FIG. 3.

Figure 2:
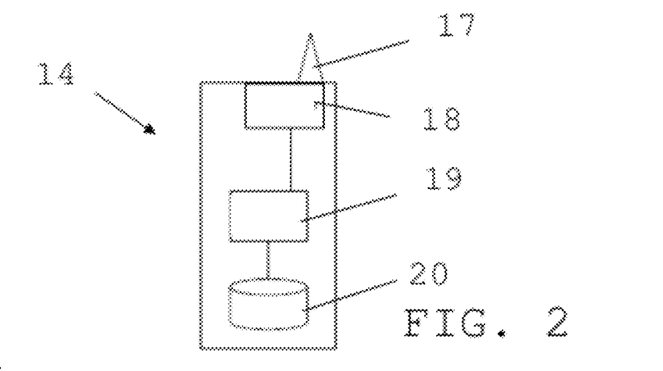

FIG. 2 thus shows an exemplifying user equipment and here the first user equipment 14. As shown in FIG. 2, the example UE 14 includes a processor 19, a memory 20, a transceiver 18, and an antenna 17. In particular embodiments, some or all of the functionality described below as being provided by mobile communication devices or other forms of UE may be provided by the UE processor executing instructions stored on a computer-readable medium, such as the memory 20 shown in FIG. 2. Alternative embodiments of the UE may include additional components beyond those shown in FIG. 2 that may be responsible for providing certain aspects of the UE's functionality, including any of the functionality of the invention described below and/or any functionality necessary to support the solution described below.

Figure 3:
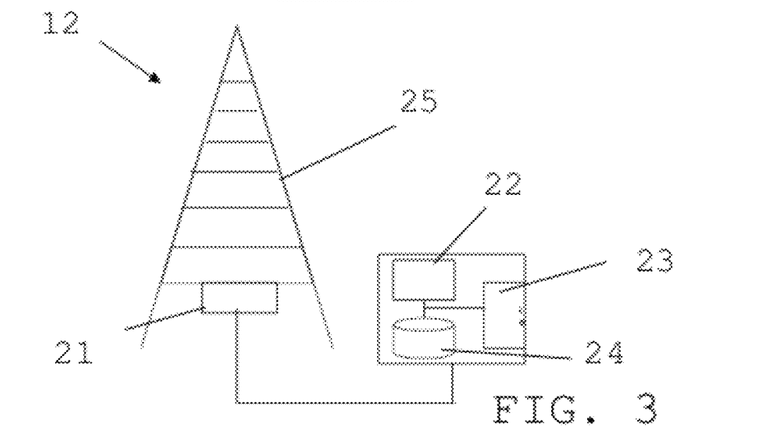

Similarly FIG. 3 shows an exemplifying base station, here the second base station 12. As shown in FIG. 3, the example base station 12 includes a processor 22, a memory 24, a transceiver 21, and an antenna 25. The antenna 25 is here provided as an aerial interface towards various user equipment. However in order for enabling the second base station 12 to communicate with other devices in the wireless communication network the base station 12 is also provided with a network interface 23. In particular embodiments, some or all of the functionality described below as being provided by a mobile base station, a base station controller, a Node B, an enhanced Node B, and/or any other type of mobile communications node may be provided by the base station processor 22 executing instructions stored on a computer-readable medium, such as the memory 24 shown in FIG. 3. Alternative embodiments of the base station may include additional components responsible for providing additional functionality, including any of the functionality identified below and/or any functionality necessary to support the solution described below.

The invention will in the following be described in relation to a single frequency transmission technique, such as High Speed Single Frequency Network (HS-SFN). It should however be realized that the invention is in no way limited to this type of network and technique.

Figure 4:
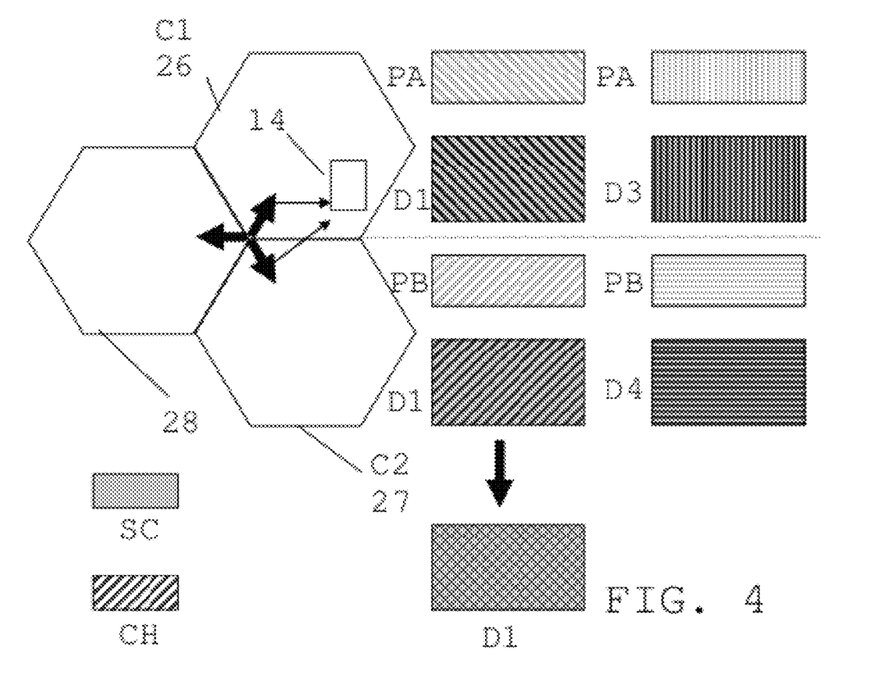

The first, second and third base stations 11, 12 and 13 shown in FIG. 1 each provide at least one cell and in this example they provide one cell each. These cells are shown in FIG. 4. Here there is thus a first cell C1 26 provided by the first base station, a second cell C2 27 provided by the second base station and a third cell 28 provided by the third base station. As the first user equipment 14 is served by the first base station it is located in the coverage of the first cell 26. It should here be realized that it is possible for a base station to provide more than one cell.

Downlink multi-point transmission techniques are mainly useful when the signal strength for multiple cells is comparable and the non-serving cells are partially loaded (and thus have available downlink resources). To determine whether or not a UE should be configured so that downlink multi-point transmission is possible the network can reuse existing events (e.g., Event 1a/b) and measurements (e.g. UE power headroom (UPH) or Channel Quality Index (CQI)). Alternatively new measurements and events could be defined.

The fundamental idea behind single frequency techniques is to increase the power/amplitude of the received signal at the UE by transmitting the identical signal from multiple cells. The potential gains for the UE or for the network performance stem from the
- Additional receive power
- Additional spatial diversity Note that in order to ensure that the signal transmitted from the different cell can combine the same channelization codes and scrambling code need to be used by all the cells. FIG. 4 illustrates how single frequency network techniques could be established for High Speed Downlink Packet Access (HS-DPA), on a per sub-frame basis for specific UEs.

In the example of FIG. 4, where the SFN technique is used, it is assumed that two cells, the first and the second cell 26 and 27 have at least one carrier frequency in common and that cells normally are separated by use of two different scrambling codes; here denoted SCA and SCB. It is furthermore assumed that the first cell 26 is the serving cell for the UE of interest, the first UE 14. In a certain sub-frame the second cell 27 can assist the first cell 26 by transmitting the same data and using the same scrambling code SCA instead of SCB. The scrambling code SCA is thus a common scrambling code to be used in both the first and second cell 26 and 27 for the data D1. In the example given in FIG. 4, the first cell 26 is shown as transmitting a first pilot signal PA on a first and third pilot signal channel, where the first pilot signal on the first pilot signal channel is followed by data D1 on a first downlink data communication channel and the first pilot signal PA on the third pilot signal channel is followed by data D3 on a third downlink data communication channel. Here the data D1 on the first downlink data communication channel as well as the data D3 on the third downlink data communication channel is scrambled using said first scrambling code SCA. It is also shown how the second cell 27 transmits a second pilot signal PB on a second and fourth pilot signal channel which pilot signals PB on the second and fourth pilot signal channels are followed by data on a second and fourth downlink data communication channel. However the data sent on the second downlink data communication channel is there the first data D1, which is also scrambled using the first scrambling code SCA, while the data sent on the fourth downlink data communication channel is fourth data D4 scrambled with the second scrambling code SCB. In this way the first user equipment 14 receives the same two data streams with the same or identical data D1 via the first and second cells 26 and 27 via two separate downlink data communication channels. The pilot signal channels may here be High-Speed Common Pilot Indicator Channels (CPICH), while the downlink data communication channels may be High Speed-Physical Downlink Shared CHannels (HS-PDSCH).

Figure 5:
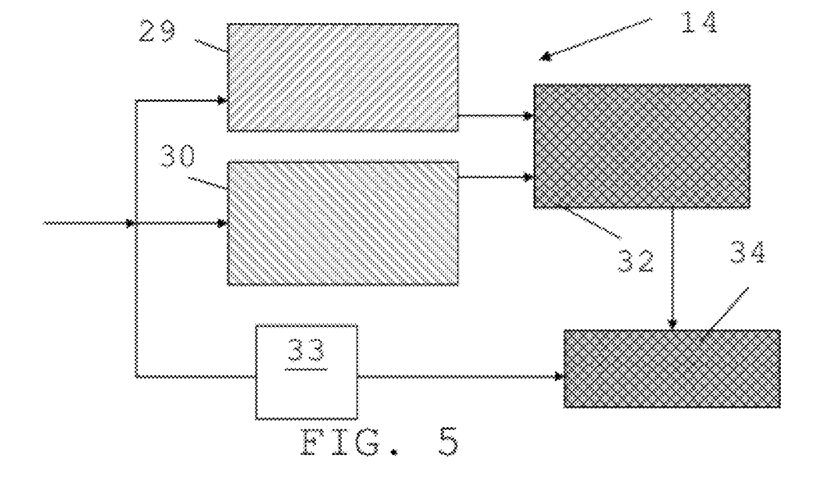

FIG. 5 schematically shows the structure of the first UE 14 for demodulating this data. The structure shown in FIG. 5 is here typically implemented at least partly using the processor of FIG. 2.

The first UE comprises a first channel estimating unit 29 configured to estimate the first downlink data communication channel from the first cell and a second channel estimating unit 30 configured to estimate the second downlink data communication data channel from the second cell. The first UE 14 furthermore comprises a unit 32 for estimating a composite channel based on the two channel estimates performed by the first and second channel estimating units 29 and 30. The unit 32 is therefore a composite channel estimating unit. The composite channel estimating unit 32 determines equalizer components of the composite channel, which components are provided to an equalizer 34. The first UE 14 furthermore comprises a unit 33 for descrambling configured to receive data in the first downlink data channel from the first cell 26 and in the second downlink data communication channel from the second cell 27 and descramble the data received from the first and second cell, which unit 33 is thus a descrambling unit using the same de-scrambling code corresponding to the first scrambling code SCA.

As can be seen in FIG. 5, in the first UE 14 the channel used to derive the equalizer coefficients is based on the pilot signals PA and PB. For an "assisted" transmission the payload data that is fed to the equalizer 34 will be a superposition of two identical signals, which have propagated through two different channels (FIG. 4). Hence both the first downlink data communication channel associated with the first cell and the second downlink data communication channel associated with the second cell need to be estimated. More specifically, the second channel associated with the second cell 27 may be estimated from a CPICH pilot transmitted by the second cell 27. The combined channel is then used to derive the coefficients of a slightly modified equalizer.

As mentioned earlier, the same data in two data streams is transmitted to the first user equipment 14 from both the first and second cells 25 and 26.

For single frequency network techniques the power of the signal transmitted from the two cells are added together. However, at the UE the two signals will have different relative phase. This will lead to If the signals have the same phase they will add constructively and therefore the gain is large.

If the signals have "opposite" phase they will add destructively and therefore there may be a loss.

To maximize the performance gains associated with single frequency network techniques where the same data is transmitted from multiple cells there are thus good reasons to standardize methods which increase the probability that signals are added constructively at the UE.

This invention discloses methods on how the relative phase of the signals transmitted from the different cells can be adjusted so that the probability that the signal can be coherently combined at the UE is maximized. This is achieved by multiplying the signal with complex-valued antenna weights (pre-coding vector) for the cells involved in the transmission before signal is transmitted.

The obtaining of an antenna weight is according to the principles of the invention performed using an antenna weight determining device, which may be placed in the first user equipment or in a network node of the network 10, such as in the second base station 12 or the first base station 11. It should however be realized that it may be placed in other types of network nodes as well such as in a radio network controller (RNC).

Figure 6:
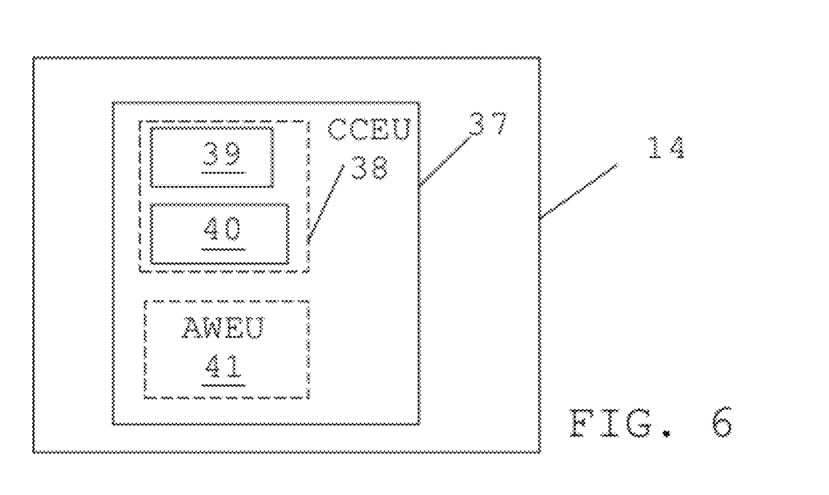
FIG. 6 shows a block schematic of a first variation of an antenna weight determining device.

FIG. 6 schematically shows a first variation of such an antenna weight determining device 37 being placed in the first user equipment 14. The antenna weight determining device 37 of the present invention comprises a unit for processing data obtained in relation to communication signals sent between at least one cell and the user equipment and a unit 41 for determining an antenna weight to be applied by the second cell based on the processing. The unit for processing data is in some variations of the invention, comprising the first variation, a unit 38 for estimating data communication channels between the second cell and the user equipment and the first cell and the user equipment. This unit 38 is here also termed a communication channel estimating unit. The unit for determining an antenna weight is here also termed an antenna weight estimating unit 41.

In the first variation of the antenna weight determining device 37, the communication channel estimating unit 38 furthermore comprises a block 39 for estimating properties of pilot signals sent from the first and second cell or a property estimating block and a block 40 for applying said properties in a system model comprising the data communication channels. The block 40 is here also termed a property application block.

Figure 7:
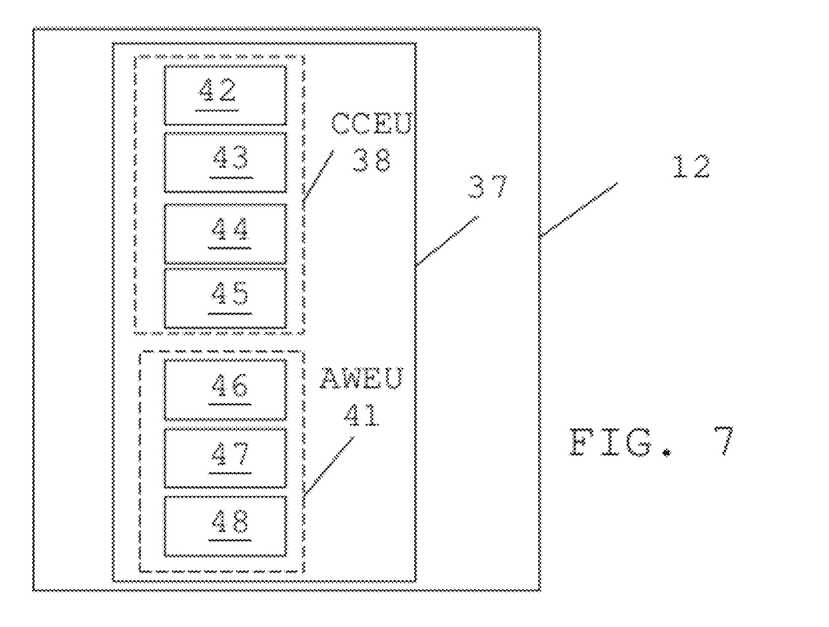
FIG. 7 shows a block schematic of a second variation of an antenna weight determining device.

FIG. 7 shows a second variation of the antenna weight determining device 37 of the invention, this time implemented in a network node, and in this case in the second base station 12. Here the unit for processing data obtained in relation to communication signals is also a communication channel estimating unit 38. However in this variation the communication channel estimating unit 38 comprises a block 42 for estimating an uplink channel associated with the downlink data communication channels or an uplink channel estimating block, a block 43 for obtaining the covariance between theses signals or covariance obtaining block, a block 44 for creating a covariance matrix R or covariance matrix creating block and a block 45 for performing an eigenvalue decomposition of the covariance matrix into a unitary matrix U and a diagonal matrix S or an eigenvalue decomposition block 45. Furthermore, in this second variation of the antenna weight determining device 37, the antenna weight estimating unit 41 comprises a block 46 for comparing power differences of the diagonal elements of the diagonal matrix or a diagonal matrix examining block, a block 47 for selecting a diagonal element or element selecting block and a block 48 for selecting a pre-coding vector in the unitary matrix corresponding to the selected diagonal element of the diagonal matrix or a pre-coding vector selecting block.

Figure 8:
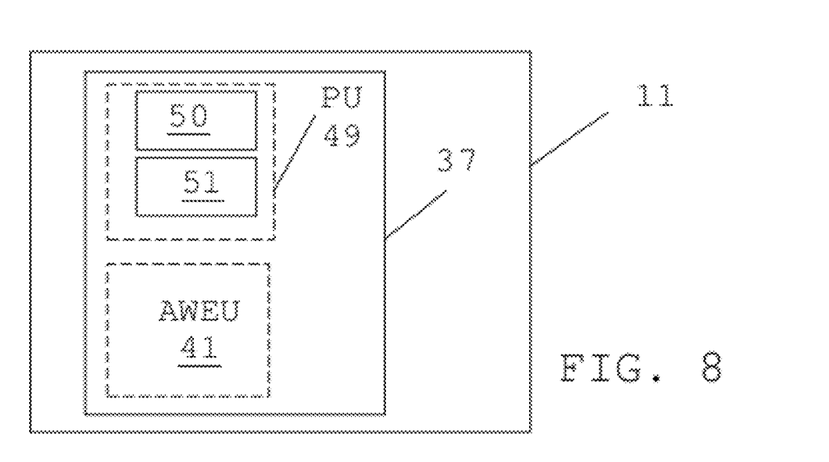

FIG. 8 shows a block schematic of a third variation of an antenna weight determining device 37. Also this antenna weight determining device is provided in a network node in the network, and in this case in the first base station 11. In this third variation the unit 49 for processing data or processing unit comprises a block 50 for changing the antenna weight of the second cell or an antenna weight changing block and a block 51 for measuring feedback information concerning the proper reception of data or a feedback information measuring block.

Figure 9:
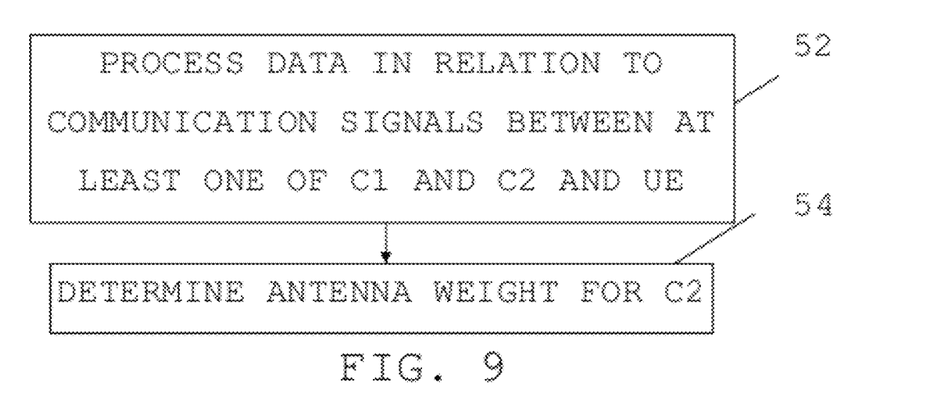

As mentioned earlier the antenna weight determining device may be provided in either the network or in the first UE and now a first embodiment of the invention will be described as being applied in an antenna weight determining device according to any of the variations with referenced being made also to FIG. 9.

In order to improve handling of the two data streams sent in downlink data communication channels to the first user equipment 14 via the first and a second cells 26 and 27, the data processing unit, which is realized as a communication channel estimating unit 38 in the first and second variations and as the processing unit 49 in the third variation, processes data obtained in relation to communication signals sent at least between one cell and the user equipment, step 52, which at least one cell may be either the first or the second cell 26 and 27. Thereafter the antenna weight estimating unit 41 determines an antenna weight to be applied by the second cell 27 based on the above-mentioned processing, step 54.

The antenna weight is then provided to the base station providing the second cell 27, which is here the second base station 12, for being employed in the transmission of downlink data via the second cell 27. In this way it is possible to for instance obtain a strong composite signal a the first UE 14 that is easily decoded. This may be used for increasing that data rates.

The network thus pre-codes some of the signals (including the HS-PDSCH) transmitted from the second cell 27 by a complex weight with the purpose of improving the signal quality of the pre-coded signal at the UE. The pre-coding weight can then either be decided by the UE and fed back to the network or decided autonomously by a network node such as an Node B based on existing uplink channels.

Figure 10:
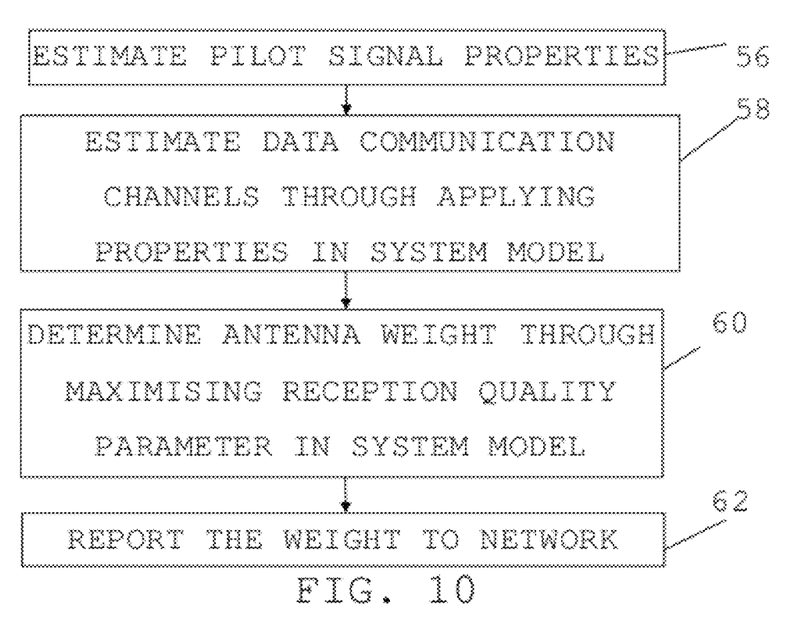

As this general functioning has been described a second more specific embodiment, where the antenna weight determination is performed in the first UE 14 as exemplified by the antenna weight determining device of FIG. 6 will now be described with reference also being made to FIG. 10.

Generally the antenna weight determining device 37 provided in the first UE 14
 estimates a preferred antenna weight based on pilot signals, in this case CPICH pilots transmitted from the first cell 26 and the second cell 27. When selecting the antenna weights the UE can maximize a reception quality parameter of the data signals, such as maximizing the received signal code power (RSCP) or maximizing the received Signal to Interference-plus-Noise Ratio (SINR), and
 reports the preferred antenna weight, for instance in the form of an index back to the second base station or Node B perhaps together with a Channel Quality Indicator (CQI), and the weight is applied for the data channels, here in the form of high Speed-Physical Downlink Shared Channel (HS-PDSCHs) associated with the second cell 27. During the transmission, the second base station informs the first UE which weight (index) is used.

In the UE side, both downlink data communication channels—that from the first cell 26 and from the second cell 27—are estimated. The composite channel for the transmission is calculated with estimated channel and precoding weight. The composite channel estimate is then used for the demodulation.

For single frequency network transmission techniques identical data is transmitted from multiple cells to the same UE. Since the signals from the different cells might have different phase at the UE receiver, a weight can be added between the two cells and the signal can be coherently combined.

According to the second embodiment a system model is used for determining the weight.

Let the signal transmitted from cell j be written as $$x_j(n) = \sqrt{P_j} \cdot s(n) \tag{1}$$

where $P_j$ represents the transmission power associated with the High Speed Downlink Shared Channel HS-DSCH. The received signal at the UE antenna 17 can thus be written as $$y(n) = y_1(n) + y_2(n) + \sqrt{N_0} \cdot z(n) \tag{1}$$
$$= \left(\sqrt{P_1} \cdot h_1(n) + \sqrt{P_2} \cdot h_2(n)\right) * s(n) + \sqrt{N_0} \cdot z_1(n)$$

where $h_1(n)$ and $h_2(n)$ are the multi-path channels modeled as tapped delay lines, "A*B" denotes the linear convolution operation, and $\sqrt{N_0} \cdot z_1(n)$ is complex additive white Gaussian noise (with power $N_0$) which represents the sum of the thermal noise and signals from other transmitters that are far away.

The received signals at the UE antenna 17 is filtered and combined by chip-level minimum mean square estimator (MMSE) equalizer.

In the second embodiment where the UE signals the preferred pre-coding weight to the network, the UE can first estimate $h_1(n)$ and $h_2(n)$ from the CPICHs associated with the first and the second cells 26 and 27. Furthermore the powers $P_1$ and $P_2$ (i.e. the transmit power used on HS-PDSCH) can be computed from the estimated CPICHs power and the HS-PDSCH power offset which is signaled from Node B. The communication channel estimating unit 38 thus estimates a data communication channel between the second cell and the user equipment and the first cell and the user equipment and in this second embodiment the estimated data communication channels are downlink data communication channels. The channel estimation is furthermore performed through the property estimation block 39 of the communication channel estimating unit 38 first estimating the properties of the pilot signals, step 56, such as the transmit power $P_1$ and $P_2$ used for transmitting the pilot signals and then the processing block 40 estimates the data communication channels $h_1(n)$ and $h_2(n)$ through applying these properties in the system model comprising the first and second downlink data communication channel, step 58.

The properties of the pilot signals may thus comprise the power $P_1$, $P_2$ of the pilot signals and the property application block 38 may be configured to determine these powers, determine the power offsets of the data communication channels and modify the power of the pilot signals with the power offsets of the data communication channels before being applied in the system model by the processing block 40.

To determine the preference pre-coding vector $w=[1\ w]^H$ the UE can maximize the RSCP or the SINR from CPICHs. I.e., the preferred pre-coding vector $w_{pref}$ is given as $$w_{pref} = \underset{w \in W'}{\mathrm{argmax}} w^H H^H H w$$

where H denotes the estimated channel and w is the pre-coding vector. Notice that the optimization is performed over a set of allowed pre-coding vectors W'.

This therefore means that the antenna weight estimating unit 41 determines the antenna weight through maximising a reception quality parameter of the system model, step 60.

After the UE 14 has determined the preferred pre-coding weights it can estimate channel quality (CQI) under the assumptions that the preferred antenna weight is used by the second cell 27. The weight (index) and the CQI can be reported to the network, for instance the serving a Node B over High Speed-Dedicated Physical Control Channel (HS-DPCCH) (as in current operations), e.g. using the Rel-7 CQI format for single stream transmissions. Thus, the antenna weight determining unit 37, after having determined the antenna weight, then reports the weight to the network, possibly together with CQI, in order for the weight to be used by the second base station 12 when transmitting in the second cell 27, step 62. If the serving Node B decides to use SFN transmissions it can select the modulation and coding scheme (MCS) based on the CQI. The weight (index) used by the Node B could furthermore be signaled to the UE in the downlink; e.g. over the HS-SCCH.

It can in this way be seen that according to the second embodiment of the invention the antenna weight is determined by the UE and then reported to the network, typically to the serving Node B for application by the network. If then the network decides to use the weight, the serving Node B may inform or signal to the Node B providing the second cell as well as to the user equipment of the weight that is to be applied.

The received signal at the UE when a pre-coding vector w is used can be written as $$y(n)=(\sqrt{P_1}\cdot h_1(n)+\sqrt{P_2}\cdot w \cdot h_2(n))^* s(n)+\sqrt{N_0}\cdot z_1(n) \qquad (3)$$

The channel is estimated and used to derive the equalizer coefficients based on the pilots (CPICH of the first and second cells 26 and 27). The UE 14 first can estimate $h_1(n)$ and $h_2(n)$ from the two CPICHs and the power $P_1$ and $P_2$ from the first Cell 26 and the second Cell 27. If the pre-coding weight w is signaled to UE it then knows the composite channel which is $\sqrt{P_1}\cdot h_1(n)+w\cdot\sqrt{P_2}\cdot h_2(n)$. The composite channel is then used to derive the coefficients of a slightly modified equalizer 34, and the subsequent decoding remains the same.

Figure 11:
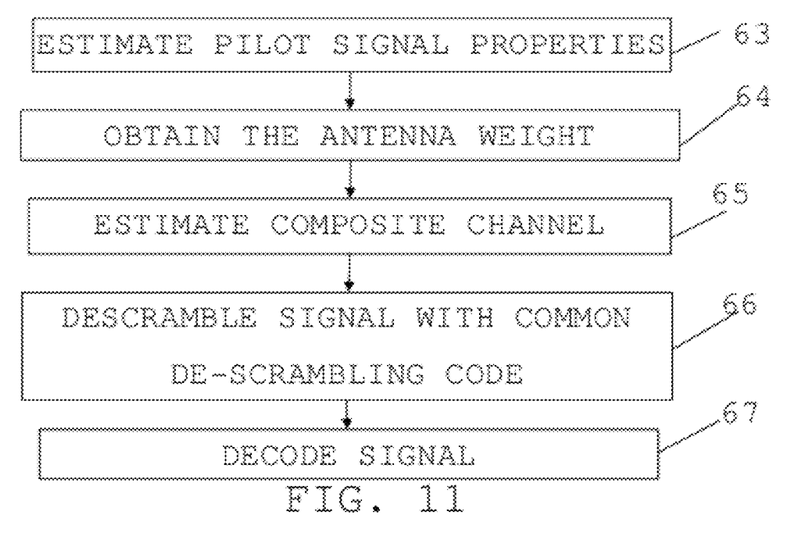

This means that the first and second channel estimators, 29 and 30 estimate the pilot signal properties of the two cells, step 63. The composite channel determining unit 32, then obtains the antenna weight, perhaps through signalling from the network or through knowledge of the previously determined antenna weight, step 64, and thereafter estimates a composite channel, step 65. Data D1 from the two downlink data communication channels is then received and descrambled by the descrambling unit 33 using the common first descrambling code corresponding to the scrambling code SCA, step 66, and then the signal is decoded in the equalizer 34, step 67. Because of the used weight the quality of the signal is improved, which simplifies decoding.

The above described way of determining antenna weight in the UE is a closed loop method of determining the weight.

In an alternative third embodiment both the pilots and the data in the second cell 27 are pre-coded. The antenna weight can then be predicted in a base station or Node B with an open loop method instead of by UE. This means the antenna weight determining device may be provided in a network node, such as the second or first base station 12, for determining the weight to be applied in the second cell 27. An antenna weight determining device operating according to this principle is the one shown in FIG. 7. How this may be used according to the third embodiment will now be described with reference also being made to FIG. 12, which shows as number of method steps being performed by the antenna weight determining device of FIG. 7.

In this third embodiment the network selects pre-coding weight based on exploiting the already existing uplink signals.

One example of a signal that can be used is the DPCCH. By using the DPCCH in combination with, e.g., the uplink power headroom information signaled in the scheduling information the network can derive an estimate of the uplink channel associated with the links that are being considered for HS-SFN transmissions. It should be noted that uplink and downlink are in general not reciprocal. More specifically the instantaneous uplink and downlink channel realizations are not reciprocal. However, the long term effects such as the average received power are reciprocal or differ by a fixed offset which depends on, e.g., the carrier frequency. In addition to measuring the received power on each antenna also the covariance between the signals received by different antennas is stored and filtered. In this way a covariance matrix R can be created, where the received power for each antenna is on the main diagonal, and the covariance between signals to antenna a1 and a2 is contained in the matrix element of row a1 and column a2. Filtered versions of this covariance matrix R can often be assumed to be valid also for the transmit antennas because of the statistical reciprocity property. One can perform an eigenvalue decomposition of the covariance matrix R into a unitary matrix U and a diagonal matrix S as $R=U*S*U^H$ where $U^H$ denotes the Hermitian or conjugate transpose of the matrix U. The values on the diagonal of the matrix S can be interpreted as relative powers or gains (or losses).

Figure 12:
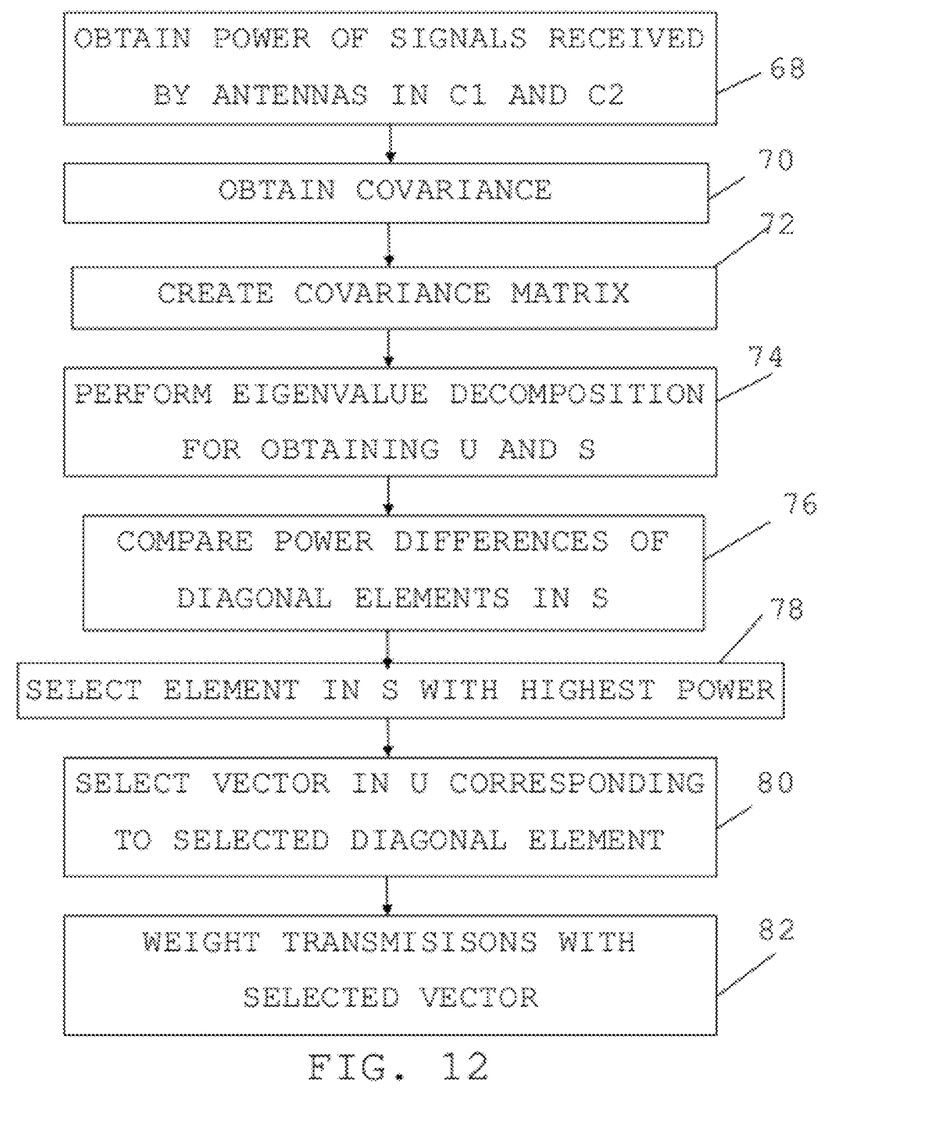

Thus in the third embodiment the uplink channel estimating block 42 of the communication channel estimating unit 38 obtains the power of the signals received by the antennas 36 and 25 in the first and the second cells 26 and 27, i.e. by the antennas 35 and 25 of the first and second base stations 11 and 12 for estimating an uplink channel, step 68, then the covariance obtaining block 43 obtains the covariance between these channels, step 70, which is followed by the covariance matrix creation block 44 creating the covariance matrix R and the eigenvalue decomposition block 45 performing an eigenvalue decomposition of the covariance matrix into a unitary matrix U and a diagonal matrix S, step 74. Here the obtaining of the power of the received signals is optional.

The n:th diagonal element of S corresponds to the expected gain (or loss) a signal would experience if it was transmitted using a precoding vector corresponding to the n:th column of the matrix U. This fact can be used to easily compare how different precoding vectors compare in terms of average power differences. Based on the derived precoding vectors in the matrix U the network can select a preferred pre-coding vector. Notice that preferred pre-coding vector applied by the network either can be signaled to the UE (if non pre-coded CPICH pilots are used) or, alternatively, also applied to the CPICHs.

The diagonal matrix examining block 46 of the antenna weight estimating unit 41 therefore compares power differences of the diagonal elements of the diagonal matrix S, step 76, the element selecting block 47 selects a diagonal element, step 78, and the pre-coding selecting block 48 selects a pre-coding vector in the unitary matrix U corresponding to the selected diagonal element of the diagonal matrix S as a weight to be applied, step 80.

As one extreme this scheme could be used for deciding from which cell data should be transmitted. One example of such an algorithm would be to look at the vector associated with largest gain (in the diagonal) of the matrix S and perform the transmissions from this cell only. Note that in this case no pre-coding vector needs to be signaled to UE.

After the weight has been selected in this way the transmission of the first data D1 is made by the second base station 12 in the second cell 27 using the selected vector as an antenna weight for the second downlink data communication channel. The second antenna 25, perhaps together with the transceiver 21, may be considered to be a unit for transmitting data to the user equipment from the second cell, which data is thus weighted using the determined antenna weight. The transmissions made by the antenna 25 are thus weighted with the selected pre-coding vector, step 82, and the selected weight with advantage signalled to the first UE 14.

Figure 13:
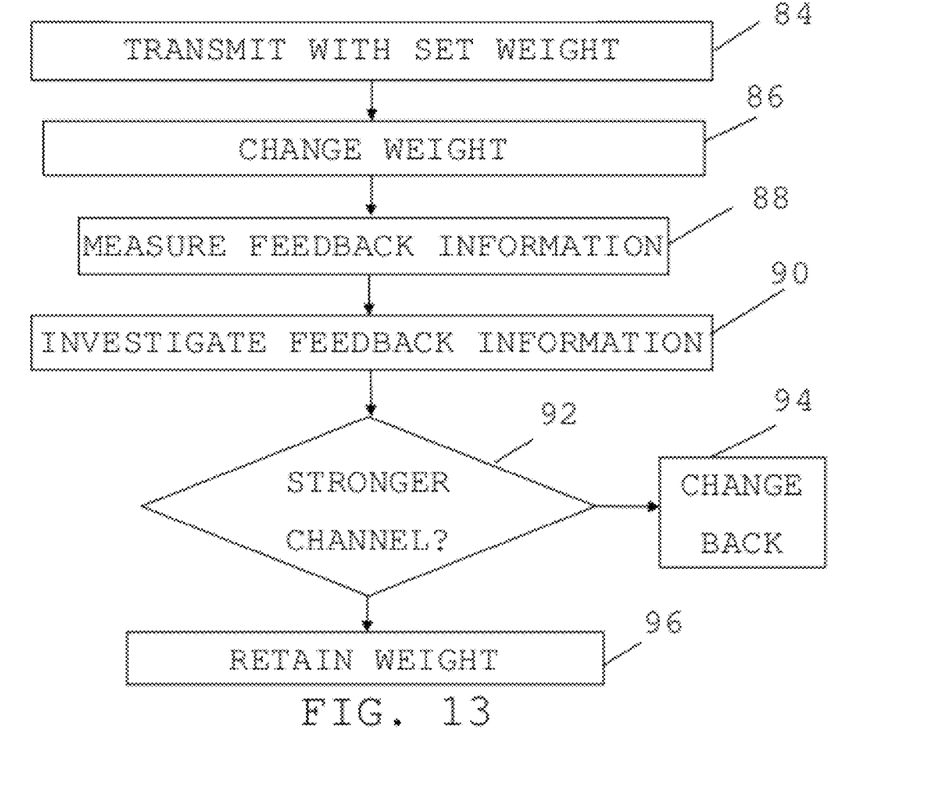

Now a fourth embodiment of the way in which weights may be determined will be described based on the antenna weight determining device shown in FIG. 8 together with the method steps in FIG. 13. According to this fourth embodiment a probing algorithm is used in which the network, occasionally change the antenna weight associated with the second cell 27. By measuring the Hybrid Automatic Repeat ReQuest-Acknowledgement (HARQ-ACK) feedback information transmitted on HS-DPCCH the network (serving Node B) can estimate whether or not the new pre-coding vector results in a stronger channel. This means that in this fourth embodiment the antenna weight determining device 37 may also be provided in a network node, such as in the first base station 11. The antenna 25 of the second base station 12 in this fourth embodiment is here first transmitting with an initially set weight, step 84. Thereafter the antenna weight changing block 50 of the processing unit 49 changes the antenna weight, step 86. If the antenna weight determining device is provided in the first baste station 11 and the second cell is handled by another base station like the second base station 12, then also the second base station is informed of the new weight as well as perhaps also the user equipment unit, and the new weight is then applied in the second cell 27. Thereafter the feedback measuring block 51 measures feedback information concerning the proper reception of data via the first cell 26, i.e. acknowledgements such as ACKs and NACKs received by the first base station 11, step 90. Based on this information, i.e. based on a change in the pattern of feedback information, the antenna weight estimating unit 41 then determines whether to use the new antenna weight or not. If for instance the feedback information indicates that the channel is stronger, step 92, then the weight is retained, step 96, while if it indicates that the signal is weaker, step 92, then the weight may be changed back, step 94.

In this way it is possible to determine and apply an antenna weights on the transmissions made via the second cell, which can be used to improve the quality of communication in the network.

Figure 14:
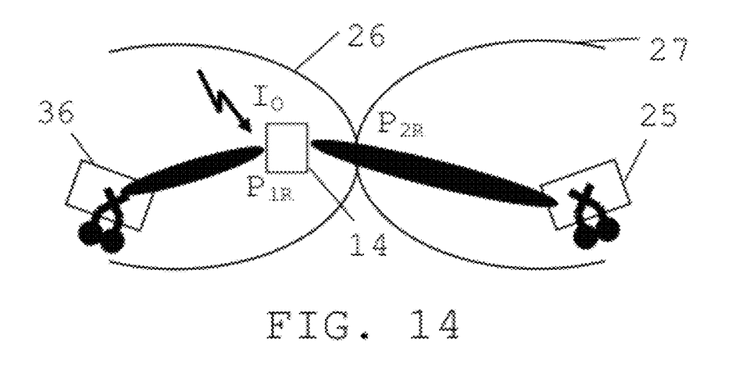
Figure 15:
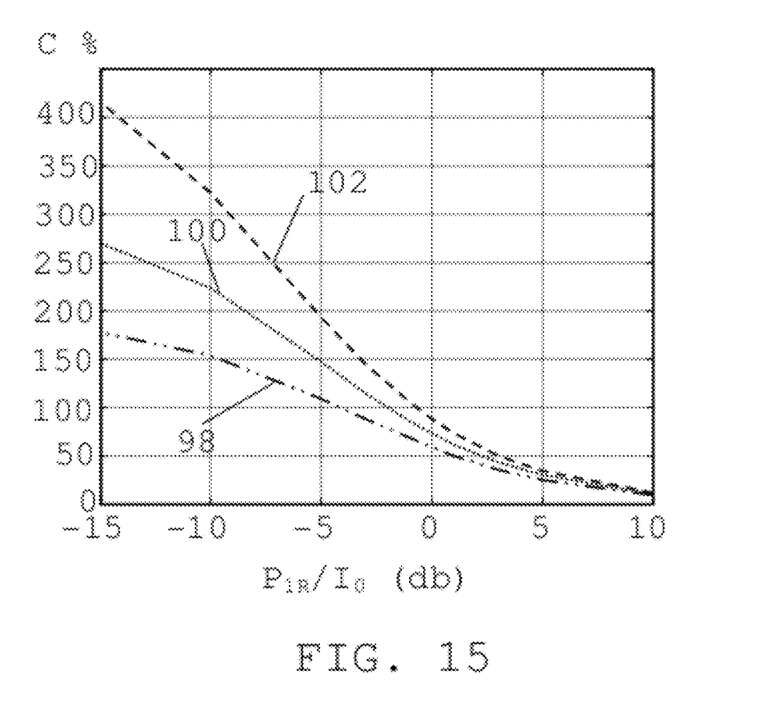
FIG. 15 is a chart showing the improvement in capacity that may be obtained with the present invention.

In order to illustrate the advantages of the invention, especially in relation to SFN with the HS-PDSCH channels being, pre-coded reference is now made to FIGS. 14 and 15.

FIG. 14 schematically shows the transmissions being made from an antenna 36 of the first base station and the antenna 25 of the second base station to the first user equipment 14. It can here be seen that the transmissions by the first base station have a power $P_{1R}$, while the transmissions of the second base stations have a power $P_{2R}$. Here $P_{1R}$ and $P_{2R}$ describe the received power associated with the two cells. $I_0$ is the interference from other cells and the white noise.

If the UE only is served by its serving cell then SINR can be written as $$SINR = \frac{(P_{1R})}{\alpha \cdot (P_{1R}) + I_0}. \tag{4}$$

where α represents the non-orthogonal factor which results in the self-interference. If both cells transmit the same signal but the two signals are not pre-coded the SINR can be written as $$SINR = \frac{(P_{1R} + P_{2R})}{\alpha \cdot (P_{1R} + P_{2R}) + I_0}. \tag{5}$$

If the two signals are pre-coded the so that they add coherently at the UE receiver the SINR can be written as $$SINR = \frac{\left(\sqrt{P_{1R}} + \sqrt{P_{2R}}\right)^2}{\alpha \cdot \left(\sqrt{P_{1R}} + \sqrt{P_{2R}}\right)^2 + I_0}. \tag{6}$$

The related capacity gain C for a pre-coder with a non-orthogonal factor of 0.4 is shown in FIG. 15. Here the vertical axis shows the capacity gain C in percent and the horizontal axis the ratio between $P_{1R}$ and $I_0$ in dB, the dash-dotted curve 98 shows the capacity gain when the ratio $P_{2R}/P_{1R}$ is −3 dB, the dotted curve 100 shows the capacity gain when the ratio $P_{2R}/P_{1R}$ is 0 dB and the dashed curve 102 shows the capacity gain when the ratio $P_{2R}/P_{1R}$ is 3 dB. From FIG. 15 it is evident that there is clear gain associated with pre-coding, which may be used for increasing data rates. It can also be seen that the lower the ratio $P_{1R}/I_0$ is, the higher the capacity gain C gets.

The invention can be varied in a multitude of ways. In the above example, it was for instance assumed that the weight is only added on the data of transmitted via the second cell 27. i.e. on data in the second downlink data communication channel. In another embodiment the weight is added for both pilot and data in the second cell. This means also the transmissions on the second pilot channel of the second cell may be weighted. Furthermore, in order to simplify the power estimation, the Node B can allocate the similar power in the first cell as in the second cell during the link adaptation. Although the invention is described for a HS-SFN scenario it is also applicable to downlink multi-flow transmissions schemes given that each of the multiple individual HS-DPSCH(s) is pre-coded and transmitted from several physical antennas. Note that since all HS-DPSCH(s) is transmitted on the same frequency the same pre-coding vector may be applied on all downlink signals. The invention can also be employed in Long Term Evolution (LTE).

Here it should also be mentioned that the use of the same scrambling code for both cells is no requirement. It is thus possible to apply the inventive concept also when separate scrambling codes are used on the first and second downlink data communication channels.

It is also possible to use the invention if the two SFN cells are configured with Transmit Antenna Array (TxAA). The only difference is that the composite channel is a more complicated one since it includes both the TxAA pre-coder inside the cell and the pre-coder between cells.

Although the described solutions may be implemented in any appropriate type of telecommunication system supporting any suitable communication standards and using any suitable components, particular embodiments of the described solutions may be implemented in a network, such as that illustrated in FIG. 6.

As indicated above the antenna weight determining device and its units and their blocks may with advantage be provided in the form of a processor with associated program memory including computer program code for performing the functionality of the antenna weight determining device. The processor and program memory may here be those shown in FIGS. 2 and 3.

While the invention has been described in connection with what is presently considered to be most practical and preferred embodiments, it is to be understood that the invention is not to be limited to the disclosed embodiments and variations, but on the contrary, is intended to cover various modifications and equivalent arrangements. It is for instance possible to omit the investigating sequence transmission control element. It is also possible to implement the pilot sequence transmission control unit without the pilot sequence store. The various described way of obtaining communication line division information can be employed in all the described embodiments. Therefore the invention is only to be limited by the following claims.

The invention claimed is:

1. A method of improving handling of two data streams sent in downlink data communication channels to a user equipment via a first and a second cell of a wireless communication network, the method being performed by an antenna weight determining device and comprising:

processing data obtained in relation to communication signals sent between at least one of the cells and the user equipment, said processing comprising estimating data communication channels between the second cell and the user equipment and the first cell and the user equipment, wherein said estimating comprises estimating uplink data communication channels associated with the downlink data communication channels through obtaining the covariance between signals received by antennas of the first and second cells, creating a covariance matrix R, and performing an eigenvalue decomposition of the covariance matrix into a unitary matrix U and a diagonal matrix S; and determining an antenna weight to be applied by the second cell based on said processing, wherein said determining the antenna weight comprises comparing power differences of the diagonal elements of the diagonal matrix, selecting a diagonal element and selecting a pre-coding vector in the unitary matrix corresponding to the selected diagonal element of the diagonal matrix as a weight to be applied by the second cell in downlink.

2. The method of claim 1, wherein the estimating comprises estimating data communication channels through applying properties of pilot signals sent from the first and second cell in a system model comprising the data communication channels.

3. The method of claim 2, wherein the properties of the pilot signals comprise the power of the pilot signals and the estimating comprises determining the powers of the pilot signals, determining the power offsets of the data communication channels and modifying the power of the pilot signals with the power offsets of the data communication channels before being applied in the system model.

4. The method of claim 2, wherein a preferred weight is determined through maximizing a reception quality parameter of the data signals.

5. The method of claim 2, further comprising reporting the determined antenna weight to the network.

6. The method of claim 1, wherein the selected pre-coding vector is a pre-coding vector for which the corresponding diagonal element of the unitary matrix has the largest gain.

7. The method of claim 1, wherein the processing comprises changing the antenna weight of the second cell and measuring feedback information concerning the proper reception of data, while the determining of the antenna weight comprises determining whether or not to use the new antenna weight based on a change in the pattern of feedback information.

8. The method of claim 1, further comprising transmitting data to the user equipment from the second cell, which data is weighted using the determined antenna weight.

9. The method of claim 8, wherein the transmitted data is identical to data sent via the first cell and scrambled using a scrambling code that is common for the first and second cell.

10. The method of claim 1, wherein the antenna weight is also used in the transmission of the pilot signal.

11. The method of claim 1, wherein the antenna weight is also signalled to the user equipment.

12. An antenna weight determining device for improving handling of two data streams sent in downlink data communication channels to a user equipment via a first and a second cell of a wireless communication network, the antenna weight determining device comprising:

a processor circuit adapted to process data obtained in relation to communication signals sent between at least one of the cells and the user equipment and to estimate data communication channels between the second cell and the user equipment and the first cell and the user equipment, wherein the processor circuit is adapted to estimate uplink channels associated with the downlink data communication channels by obtaining the covariance between signals received by antennas of the first and second cells, creating a covariance matrix R, and performing an eigenvalue decomposition of the covariance matrix into a unitary matrix U and a diagonal matrix S, and wherein the processor circuit is further adapted to determine an antenna weight to be applied by the second cell based on said processing, by comparing power differences of the diagonal elements of the diagonal matrix, selecting a diagonal element, and selecting a pre-coding vector in the unitary matrix corresponding to the selected diagonal element of the diagonal matrix as a weight to be applied.

13. The antenna weight determining device of claim 12, wherein the selected pre-coding vector is a pre-coding vector for which the corresponding diagonal element of the unitary matrix has the largest gain.

14. The antenna weight determining device of claim 12, being provided in the network wherein the processor circuit is adapted to change the antenna weight of the second cell and to measure feedback information concerning the proper reception of data, and is further adapted to determine whether to use the new antenna weight or not based on a change in a pattern of feedback information.

15. The antenna weight determining device of claim 12, further comprising a transceiver adapted to transmit data to the user equipment from the second cell, which data is weighted using the determined antenna weight.

16. The antenna weight determining device of claim 15, wherein the transmitted data is identical to data sent via the first cell and scrambled using a scrambling code that is common for the first and second cell.

17. The antenna weight determining device of claim 12, wherein the antenna weight is also used in the transmission of the pilot signal.

18. The antenna weight determining device of claim 12, wherein the processor circuit is further adapted to signal the antenna weight in the downlink.

19. The antenna weight determining device of claim 12, wherein said antenna weight determining device is provided in a Node B.

\* \* \* \* \*